Apr. 3, 1923.
J. A. MORROW
SPRING WHEEL
Filed Sept. 5, 1919
1,450,748
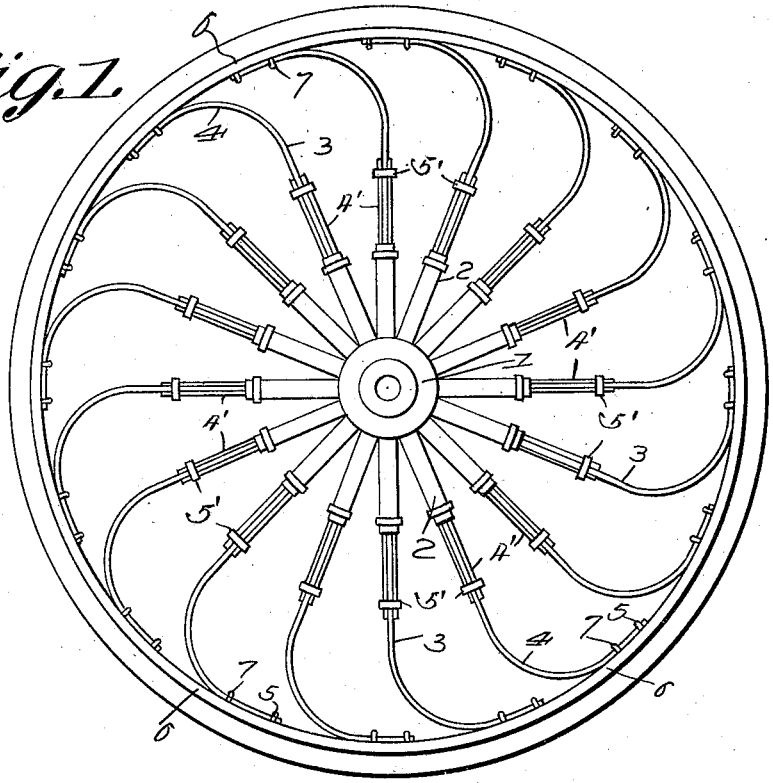
Fig.1
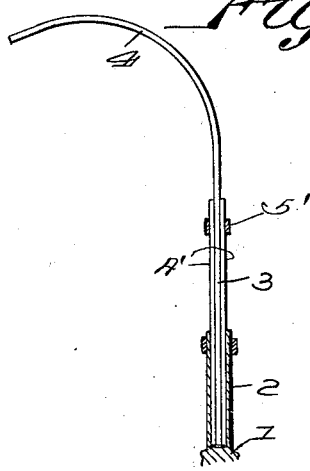
Fig.2
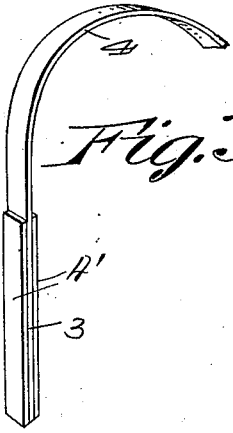
Fig.3
Fig.4.
Inventor
J. A. Morrow,
By
E. Hume Talbert, Attorney Patented Apr. 3, 1923.

1,450,748

UNITED STATES PATENT OFFICE.

JAMES A. MORROW, OF WICHITA FALLS, TEXAS.

SPRING WHEEL.

Application filed September 5, 1919. Serial No. 321,799.

*To all whom it may concern:*

Be it known that I, JAMES A. MORROW, a citizen of the United States, residing at Wichita Falls, in the county of Wichita and State of Texas, have invented new and useful Improvements in Spring Wheels, of which the following is a specification.

The purpose of the invention is to provide a resilient or spring wheel in which the resiliency is obtained through the spokes and mostly at the outer extremities of the latter, the spokes being supported in sockets emanating from the wheel hub and being arched adjacent the rim of the wheel and secured to the rim by appropriate fastening means.

The invention is illustrated and described in a specific modification to which, however, it is not to be restricted. The right is reserved to make such changes or alterations as actual reduction to practice may suggest, in so far as such changes or alterations are compatible in spirit with the annexed claim.

In the accompanying drawings:—

Figure 1 is a side elevation of the invention.

Figure 2 is a detail view partly in section illustrating one of the spokes and the socket for the latter.

Figure 3 is a detail perspective view of one of the spokes.

Figure 4 is a transverse sectional view through the wheel rim.

The hub 1 is provided with the radially projecting sockets 2 which receive the inner ends of the spokes 3, the latter being in the form of leaf springs with arcuate outer extremities 4 and being reinforced at the main portions by supplemental leaf springs 4' disposed on opposite sides of each main spring 3. A clip 5' encircles the supplemental springs 4 adjacent their open ends and holds them in firm contact with the main spring or spoke 3.

The rim 6 which is designed to receive and support a tire 8 is secured to the outer extremities of the spokes 3, the extreme ends of the latter being secured to the inner periphery of the rim by clips 5 and similar clips 7 also operate to secure these outer extremities to the rim 6 but are disposed back of the clips 5 and thus serve to offset any tendency to lateral movement of the rim. The clips 5 and 7 are of the tubular form shown and they completely embrace the outer extremities of the spokes in securing the same to the rim.

It will be observed that practically all the resiliency of the wheel is obtained at the arcuate portions of the spokes or leaf springs 3 but it is also to be observed that as the load or vibration on the wheel increases, the shock is transferred to the supplemental leaf springs 4'. The clips 5', embracing the outer extremities of the supplemental leaf springs 4', positively preclude any lateral shifting of these extremities with relation to the main springs or spokes but at the same time permit a slight relative sliding movement between the main and supplemental springs which result from the flexing of the former due to the load imposed on the same. The supplemental leaf springs are of a length which terminates them short of the arcuate portions of the main springs and thus are flexed only upon the application of their heavy loads on the wheel, arcuate portions of the main spring taking care of the ordinary load.

Having described the invention what is claimed as new and useful is:

A resilient wheel comprising a hub formed with radially projecting sockets, a rim, and resilient spokes consisting of main flat leaf springs whose outer extremities are of arcuate shape and secured to the inner periphery of the rim, supplemental flat springs of substantially half the length of the main springs and disposed on opposite sides of the latter, the supplemental springs terminating short of the arcuate portion of the main springs, the inner terminals of the main and the supplemental springs being disposed in the sockets of the hub and clips in surrounding relation to the outer extremities of the supplemental springs and embracing the adjacent portion of the main spring.

In testimony whereof I affix my signature.

JAMES A. MORROW.